(12) United States Patent
Mattmuller

(10) Patent No.: US 10,988,026 B2
(45) Date of Patent: Apr. 27, 2021

(54) VEHICLE ELECTRICAL LOAD SHED

(71) Applicant: Ford Global Technologies, LLC, Dearborn, MI (US)

(72) Inventor: Stephenson Tyler Mattmuller, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 16/142,080

(22) Filed: Sep. 26, 2018

(65) Prior Publication Data

US 2020/0094679 A1  Mar. 26, 2020

(51) Int. Cl.
| | | |
|---|---|---|
| *B60L 1/00* | (2006.01) |
| *H02J 1/14* | (2006.01) |
| *B60L 50/16* | (2019.01) |
| *H02J 7/00* | (2006.01) |
| *B60K 6/22* | (2007.10) |
| *B60K 6/48* | (2007.10) |
| *H02J 7/34* | (2006.01) |
| *H02J 7/14* | (2006.01) |
| *B60R 16/02* | (2006.01) |

(52) U.S. Cl.
CPC .............. *B60L 1/006* (2013.01); *B60L 1/00* (2013.01); *B60L 50/16* (2019.02); *H02J 1/14* (2013.01); *B60K 6/22* (2013.01); *B60K 6/48* (2013.01); *B60R 16/02* (2013.01); *B60Y 2200/92* (2013.01); *H02J 7/0063* (2013.01); *H02J 7/1438* (2013.01); *H02J 7/342* (2020.01)

(58) Field of Classification Search
CPC .. B60L 1/006; B60L 50/16; B60L 1/00; H02J 1/14; H02J 7/0063; H02J 7/1438; H02J 7/342; B60R 16/02; B60Y 2200/92; B60K 6/48; B60K 6/22; Y02T 10/7072
USPC ...... 307/9.1; 180/65.275, 65.1, 53.8; 701/22
See application file for complete search history.

(56) References Cited

U.S. PATENT DOCUMENTS

| | | |
|---|---|---|
| 8,767,379 B2 | 7/2014 | Whitaker |
| 8,816,530 B2 | 8/2014 | Callicoat et al. |
| 2013/0046411 A1 | 2/2013 | Al Faruque et al. |
| 2016/0204607 A1* | 7/2016 | Rogers, Jr. ............. H05B 47/11 315/151 |

* cited by examiner

*Primary Examiner* — Arnold M Kinkead
(74) *Attorney, Agent, or Firm* — Brooks Kushman PC; David Kelley

(57) ABSTRACT

A vehicle system includes an interface, an outlet, and a converter configured to, responsive to user input to the interface enabling shed mode, interrupt flow of battery current to internal vehicle loads such that power available at the outlet exceeds a predetermined threshold regardless of whether an external load is plugged into or removed from the outlet, and otherwise, maintain the flow regardless of whether an external load is plugged into the outlet.

14 Claims, 2 Drawing Sheets

VEHICLE ELECTRICAL LOAD SHED

TECHNICAL FIELD

The present disclosure relates to systems and methods for operating a vehicle in an "off-the-grid" mode.

BACKGROUND

The term "hybrid vehicle" may be used to describe vehicles having one or more sources of propulsion power, such as an internal combustion engine and an electric motor. Examples of hybrid vehicles include hybrid electric vehicles (HEV) and plug-in hybrid electric vehicles (PHEV). An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A vehicle system includes an interface, an outlet, and a converter configured to, responsive to user input to the interface enabling shed mode, interrupt flow of battery current to internal vehicle loads such that power available at the outlet exceeds a predetermined threshold regardless of whether an external load is plugged into or removed from the outlet, and otherwise, maintain the flow regardless of whether an external load is plugged into the outlet.

A system for a vehicle includes an interface, a power receptacle configured to power an external electrical load using electric energy of a power converter, wherein the converter is further connected between a battery and electric motor to transfer power therebetween, and a controller configured to, interrupt flow of current from the converter to internal vehicle loads such that power available at the receptacle exceeds a predetermined threshold regardless of whether an external load is plugged into the receptacle, responsive to engine idle and user input to the interface, and return the flow responsive to another user input to the interface or the engine transitioning from idle to drive.

A system for a vehicle includes an outlet, an inverter, and a power converter configured to, responsive to an engine being idle during user input to an interface, interrupt flow of energy to the inverter such that available non-vehicle load power at the outlet is at least 1500 Watts regardless of whether an external load is plugged into the outlet, and responsive to the engine not being idle during the input, maintain the flow regardless of whether an external load is plugged into the outlet.

DETAILED DESCRIPTION

Figure 1:
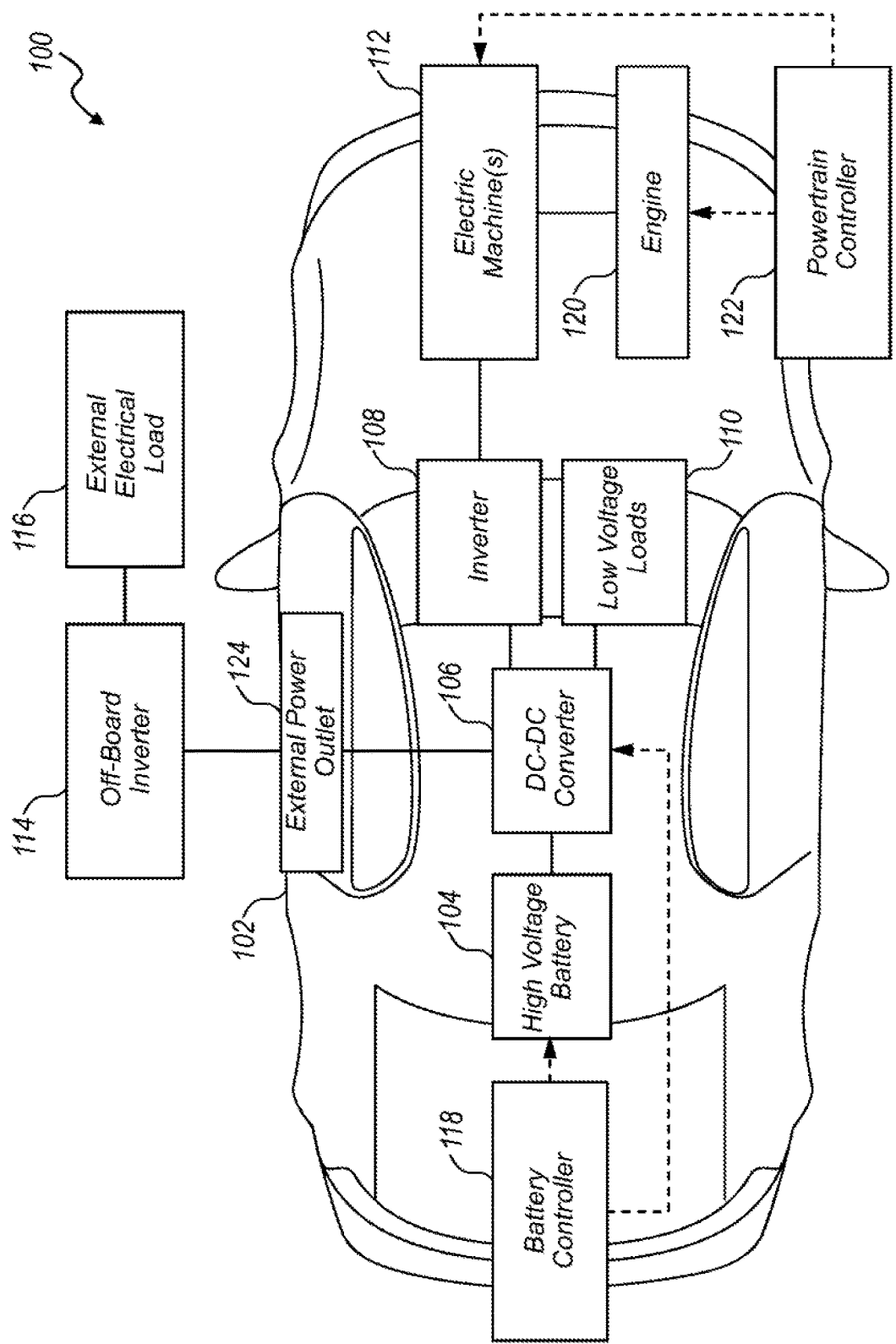
FIG. 1 is a block diagram of a plug-in hybrid electric vehicle (PHEV) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An HEV, hereinafter vehicle, may include a direct current (DC)-DC converter connected between a traction battery and an electric motor. The DC-DC converter may be configured to increase, or boost, voltage potential of the electrical power provided to the electric motor, as well as, optimize electric motor operation. Further, when the motor operates using alternating current (AC) power, the vehicle may also include an inverter connected between the DC-DC converter and the motor configured to convert the power transferred therebetween.

The DC-DC power converter used in a given application may be oversized as compared to alternators with similar applications. The DC-DC converters may be configured to output maximum power regardless of the vehicle state. This may be in contrast to an alternator that may operate at less than its maximum available output power when engine operating speed is less than a threshold, e.g., less than a predefined number of revolutions per minute (RPM). In some instances, a closed-loop engine control may be configured to increase engine RPM and boost the alternator power capability in response to system voltage being below a voltage threshold. Nevertheless, other system operating constraints, such as torque converter operating parameters, may cause the DC-DC converter output power to be less than its maximum available output power.

Accordingly, at least a portion of the maximum available output power of the DC-DC converters may be unused during some vehicle operating conditions. Moreover, a same maximum available output power DC-DC converter may be used in applications to vehicles having different power capacities and system requirements. Thus, a maximum available output power of a given DC-DC converter may, in some instances, far exceed operating requirements of the vehicle system. As one example, a given DC-DC converter may be configured to support an electrical load demand as high as 3.4 kW, while maximum electrical load of the vehicle may be less than the maximum capability of the converter, e.g., 2.4 kW, and the excess power capability of the DC-DC converter may remain unused.

A vehicle may be equipped with a user-enabled control configured to operate the vehicle in an "off-the-grid" operating mode when predefined conditions are met. In one example, responsive to engine speed being less than a threshold, the DC-DC converter may disable one or more active electrical loads of the vehicle to power a 110 VAC inverter.

Accordingly, the vehicle may operate in an "off-the-grid" mode when the engine is idle and may shed one or more electrical loads, such as, but not limited to, an inverter, front air conditioning (A/C) fan, accessory lights, charging points, camera, radar, brakes, cooled seats, and so on. Thus, the "off-the-grid" mode may enable the DC-DC converter to provide 1540 W of power at 110 VAC. As another example, under the "off-the-grid" mode, the vehicle may be configured to open and close the 110 VAC line, such that one or more switching devices and fuses of the vehicle may be downsized or entirely eliminated. The availability of the "off-the-grid" mode may be detected by consulting an owner's manual or through observation of a user notification indicative of selective electrical load shedding during powering of the load external to the vehicle.

FIG. 1 illustrates an example energy flow diagram 100 for a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods. It should be noted that the illustrated system 100-A is merely an example, and more, fewer, and/or differently located elements may be used.

The vehicle 102 may include a powersplit powertrain, such that either or both of an internal combustion engine 120 and a traction battery 104 power the wheels of the vehicle 102. In one example, the vehicle 102 may comprise a hybrid transmission (not illustrated) mechanically connected to the engine 120 and a drive shall driving the wheels. A hybrid powertrain controller (hereinafter, powertrain controller) 122 may control engine 120 operating components (e.g., idle control components, fuel delivery components, emissions control components, etc.) and monitor status of the engine 120 operation (e.g., status of engine diagnostic codes).

The hybrid transmission may also be mechanically connected to one or more electric machines 112 capable of operating as a motor or a generator. The electric machines 112 may be electrically connected to an inverter system controller (hereinafter, inverter) 108 providing bi-directional energy transfer between the electric machines 112 and at least one traction battery 104. The traction battery 104 typically provides a high voltage direct current (DC) output. In a motor mode, the inverter 108 may convert the DC output provided by the traction battery 104 to three-phase AC as may be required for proper functionality of the electric machines 112. In a regenerative mode, the inverter 108 may convert the three-phase AC output from the electric machines 112 acting as generators to the DC required by the traction battery 104. In addition to providing energy for propulsion, the traction battery 104 may provide energy for high voltage loads, such as an electric air conditioning (eAC) system and positive temperature coefficient (PTC) heater, and low voltage loads, such as electrical accessories, an auxiliary 12-V battery, and so on.

The traction battery 104 may comprise one or more battery cells, e.g., electrochemical cells, capacitors, or other types of energy storage device implementations. The battery cells may be arranged in any suitable configuration and configured to receive and store electric energy for use in operation of the vehicle 102. Each cell may provide a same or different nominal threshold of voltage. The battery cells may be further arranged into one or more arrays, sections, or modules further connected in series, in parallel, or a combination thereof. The traction battery 104 may include a two-way electrical connection, whereby it receives and stores electric energy, e.g., energy generated via regenerative braking, as well as, supplies the energy to one or more electric machines 112. Accordingly, both the engine 120 and the electric machine 112 may be configured to power the hybrid transmission that ultimately delivers torque to the wheels of the vehicle 102.

In one example, a battery controller 118 may be configured to monitor and control operation of the traction battery 104. Additionally or alternatively, the powertrain controller 122 may directly control the operation of the traction battery 14. It should be understood that throughout this disclosure, the battery controller 118, the powertrain controller 122, and other controllers that control the flow of energy of the vehicle 102 may be collectively referred to as "controllers" and generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The battery controller 118 and the powertrain controller 122 may communicate with other vehicle 102 systems and controllers over one or more hardline vehicle connections using one or more vehicle communication bus protocols, e.g., CAN and LIN.

Figure 2:
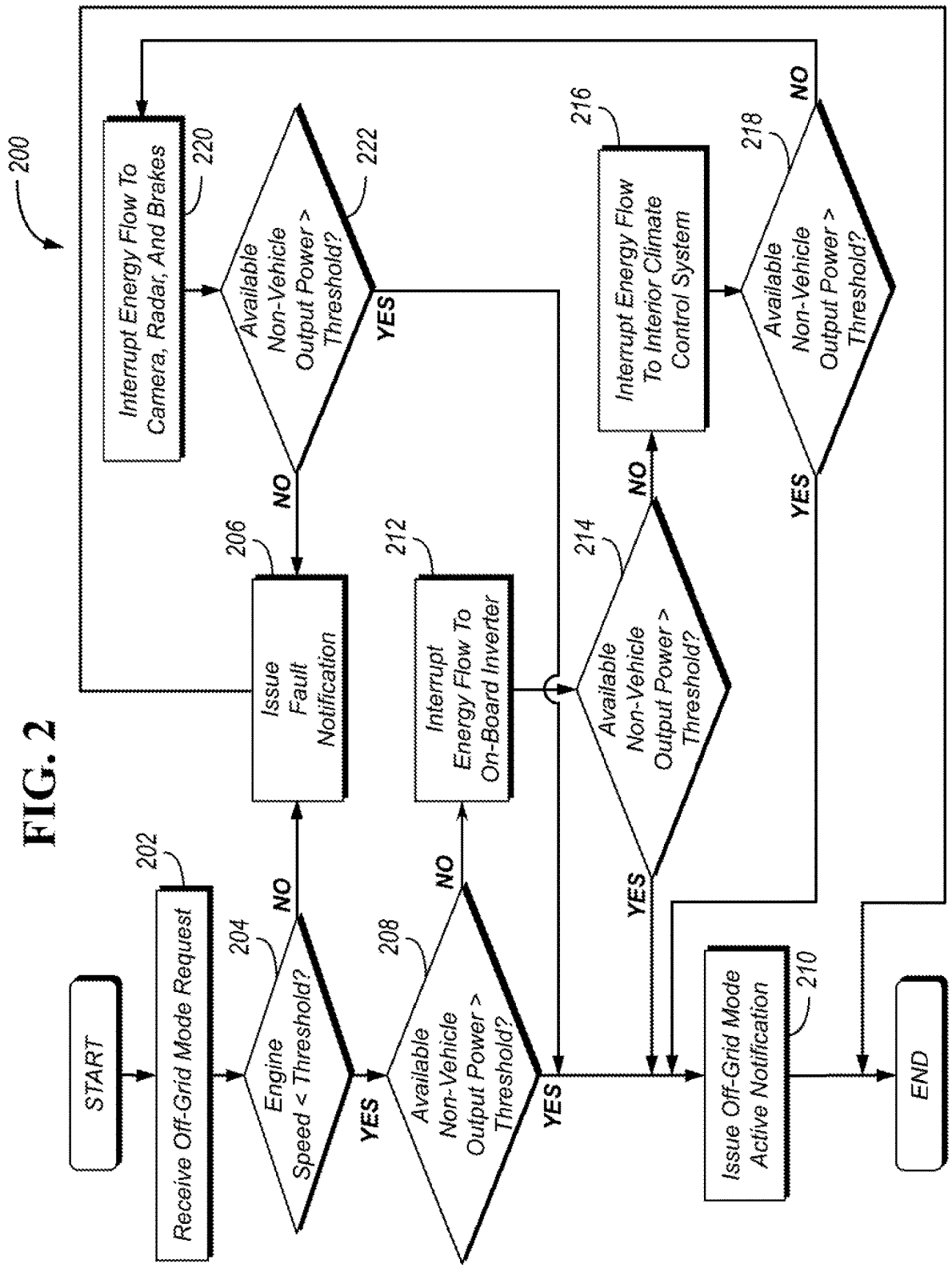
FIG. 2 is a flowchart illustrating an algorithm for operating a vehicle in an "off-the-grid" mode.

FIG. 2 illustrates an example process 200 for operating the vehicle 102 in the "off-the-grid" mode to power one or more external electrical loads 116 of the vehicle 102. One or more operations of the process 200 may be performed by vehicle 102 controllers, such as the battery controller 118 and the powertrain controller 122 described in reference to FIG. 1 and so on.

The process 200 may begin at block 202 where the battery controller 118 may detect that an "off-the-grid" mode is being requested. In one example, the battery controller 118 may receive a signal, via an electrical power outlet (or a power receptacle) 124 disposed about or accessible from exterior or interior of the vehicle 102, indicating that an external electrical load 116 has been connected to the vehicle 102. Additionally or alternatively, the external electrical load 116 may be connected to the electrical power outlet 124 via the off-board inverter 114, such that the battery controller 118 receives a signal from the off-board inverter 114 indicating that the load 116 has been connected.

Responsive to the "off-the-grid" mode request, the battery controller 118 may determine whether one or more conditions for enabling the "off-the-grid" mode have been met. As some non-limiting examples, the operating conditions for the "off-the-grid" mode may include the vehicle 102 being in PARK, speed of the engine 120 being less than a threshold, ambient temperature being within a predefined range, and so on.

Accordingly, the battery controller 118 may determine, at block 204, whether speed of the engine 120 is less than a threshold. In some examples, engine speed being less than a threshold engine speed may be indicative of the engine being idle. Other threshold and system operating requirements are also contemplated. For instance, the battery controller 118 may send a signal to the powertrain controller 122 indicative of a request to determine the speed of the engine 120. If the engine speed is greater than a threshold, the battery controller 118, at block 206, may issue a fault notification indicating that the "off-the-grid" mode to power the external electrical load 116 is unavailable. The battery controller 118 may then exit the process 200.

If the engine speed is less than an engine speed threshold, the battery controller 118, at block 208, may determine whether available non-vehicle output power is greater than an output threshold. In some examples, available non-vehicle output power being greater than an output threshold may be indicative of output power at the external electrical power outlet 124 sufficient to support external electrical loads of at least 110V AC. Responsive to available non-vehicle output power being greater than an output threshold, the battery controller 118, at block 210, may initiate enabling of the "off-the-grid" mode for the vehicle 102. The battery controller 118 may then exit the process 200.

If the available non-vehicle output power is less than an output threshold, the battery controller 118, at block 212, may interrupt energy flow from the converter to the inverter 108 to direct additional energy from the converter to the external electrical power outlet 124 to support external electrical loads. At block 214, responsive to interruption of energy flow from converter to the inverter 108, the battery controller 118 may determine whether available non-vehicle output power is greater than an output threshold. In some examples, available non-vehicle output power being greater than an output threshold may be indicative of output power at the external power outlet 124 sufficient to support external electrical loads of at least 110V AC. Responsive to available non-vehicle output power being greater than an output threshold, the battery controller 118, at block 210, may initiate enabling of the "off-the-grid" mode for the vehicle 102. The battery controller 118 may then exit the process 200.

If the available non-vehicle output power is less than an output threshold, the battery controller 118, at block 216, may interrupt energy flow from the converter to the interior climate control system to direct, from the converter, energy intended to power one or more interior climate control features to the external electrical power outlet 124 to support external electrical loads.

At block 218, responsive to interruption of energy flow from converter to the interior climate control system, the battery controller 118 may determine whether available non-vehicle output power is greater than an output threshold. In some examples, available non-vehicle output power being greater than an output threshold may be indicative of output power at the external power outlet 124 sufficient to support external electrical loads of at least 110V AC. Responsive to available non-vehicle output power being greater than an output threshold, the battery controller 118, at block 210, may initiate enabling of the "off-the-grid" mode for the vehicle 102. The battery controller 118 may then exit the process 200.

If the available non-vehicle output power is less than an output threshold, the battery controller 118, at block 220, may interrupt energy flow from the converter to the camera, radar, and brake systems to direct, from the converter, energy intended to power one or more cameras, radars, and brake system features to the external power outlet 124 to support external electrical loads.

At block 222, responsive to interruption of energy flow from converter to camera, radar, and brake systems, the battery controller 118 may determine whether available non-vehicle output power is greater than an output threshold. Responsive to available non-vehicle output power being greater than an output threshold, the battery controller 118, at block 210, may initiate enabling of the "off-the-grid" mode for the vehicle 102. The battery controller 118 may then exit the process 200.

If the available non-vehicle output power is less than an output threshold, the battery controller 118, at block 206, issue a fault notification indicating that the "off-the-grid" mode to power the external electrical load 116 is unavailable. The battery controller 118 may then exit the process 200 and the process 200 may end. In some instances, the process 200 may be repeated in response to a request to enable the "off-the-grid" mode or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
   an engine;
   an interface;
   an outlet; and
   a converter configured to,
      responsive to user input to the interface enabling shed mode and the engine being in engine idle, interrupt flow of battery current to internal vehicle loads such that power available at the outlet exceeds a predetermined threshold regardless of whether an external load is plugged into or removed from the outlet, and
      otherwise, maintain the flow of battery current to internal vehicle loads regardless of whether an external load is plugged into the outlet.

2. The system of claim 1, wherein the converter is further configured to preclude the shed mode responsive to the engine not being in engine idle.

3. The system of claim 1, wherein the converter is further configured to reestablish the flow responsive to the engine transitioning from idle to drive.

4. The system of claim 1, wherein the converter is further configured to maintain the interrupt responsive to the engine transitioning from idle to drive.

5. The system of claim 1, wherein the internal vehicle loads are inverter, climate control, or camera components.

6. A system for a vehicle comprising:
an engine;
an electric motor configured to propel the vehicle;
an interface;
a power receptacle configured to power an external electrical load using electric energy of a power converter, wherein the converter is further connected between a battery and the electric motor; and
a controller configured to,
interrupt flow of current from the converter to internal vehicle loads such that power available at the power receptacle exceeds a predetermined threshold regardless of whether an external load is plugged into the power receptacle, responsive to the engine being in engine idle and user input to the interface, and
return the flow of current responsive to either another user input to the interface, or to the engine transitioning from engine idle to drive.

7. The system of claim 6, wherein the controller is further configured to preclude the interrupt responsive to the engine not being in idle.

8. The system of claim 6, wherein the controller is further configured to maintain the interrupt responsive to the engine transitioning from idle to drive.

9. The system of claim 6, wherein the internal vehicle loads are inverter, climate control, or camera components.

10. A system for a vehicle comprising:
an outlet;
an inverter; and
a power converter configured to, responsive to an engine being idle during user input to an interface, modify flow of energy to the inverter such that available non-vehicle load power at the outlet is at least 1500 Watts regardless of whether an external load is plugged into the outlet, and
responsive to the engine not being idle during the input, maintain the flow of energy regardless of whether an external load is plugged into the outlet.

11. The system of claim 10, wherein the converter is further configured to preclude modifying the flow of energy responsive to the engine not being in engine idle.

12. The system of claim 10, wherein the converter is further configured to reestablish the flow of energy responsive to the engine transitioning from idle to drive.

13. The system of claim 10, wherein the converter is further configured to maintain modifying the flow of energy responsive to the engine transitioning from idle to drive.

14. The system of claim 10, wherein the converter is further configured to modify the flow of energy to climate control or camera components.

\* \* \* \* \*